US005178715A

United States Patent [19]

Rehberg

[11] Patent Number: 5,178,715

[45] Date of Patent: Jan. 12, 1993

[54] DEVICE FOR LIFTING FLAPS OF ENVELOPES

[75] Inventor: Heinz Rehberg, Berlin, Fed. Rep. of Germany

[73] Assignee: Francotyp-Postalia GmbH, Berlin, Fed. Rep. of Germany

[21] Appl. No.: 847,790

[22] Filed: Mar. 6, 1992

[30] Foreign Application Priority Data

Mar. 7, 1991 [DE] Fed. Rep. of Germany ....... 4107573

[51] Int. Cl.[5] .............................................. B32B 31/00

[52] U.S. Cl. ................................ 156/441.5; 156/442; 156/442.1; 156/578; 53/381.7; 53/382.1; 53/383.1

[58] Field of Search .................. 156/441.5, 442, 442.2, 156/578, 442.1; 118/264; 53/381.7, 382.2, 382.3, 383.1, 386.1, 382.1

[56] References Cited

U.S. PATENT DOCUMENTS

| | | | |
|---|---|---|---|
| 2,997,833 | 8/1961 | Nigrelli et al. | 53/382.1 |
| 4,450,037 | 5/1984 | Gavronsky | 156/442 X |
| 4,551,188 | 11/1985 | Schulze | 156/441.5 |
| 4,926,787 | 5/1990 | Fassman et al. | 156/441.5 X |

*Primary Examiner*—David A. Simmons
*Assistant Examiner*—James J. Engel, Jr.
*Attorney, Agent, or Firm*—Herbert L. Lerner; Laurence A. Greenberg

[57] ABSTRACT

A device for lifting flaps of envelopes at feed inlets of an envelope sealing machine includes a perforated suction plate having edges, and a separating plate having edges and being disposed downstream of the suction plate in an envelope feed direction. The suction plate and the separating plate are associated with a feed inlet of an envelope sealing machine. One of the edges of the suction plate is underneath one of the edges of the separating plate.

7 Claims, 2 Drawing Sheets

DEVICE FOR LIFTING FLAPS OF ENVELOPES

Figure 1:
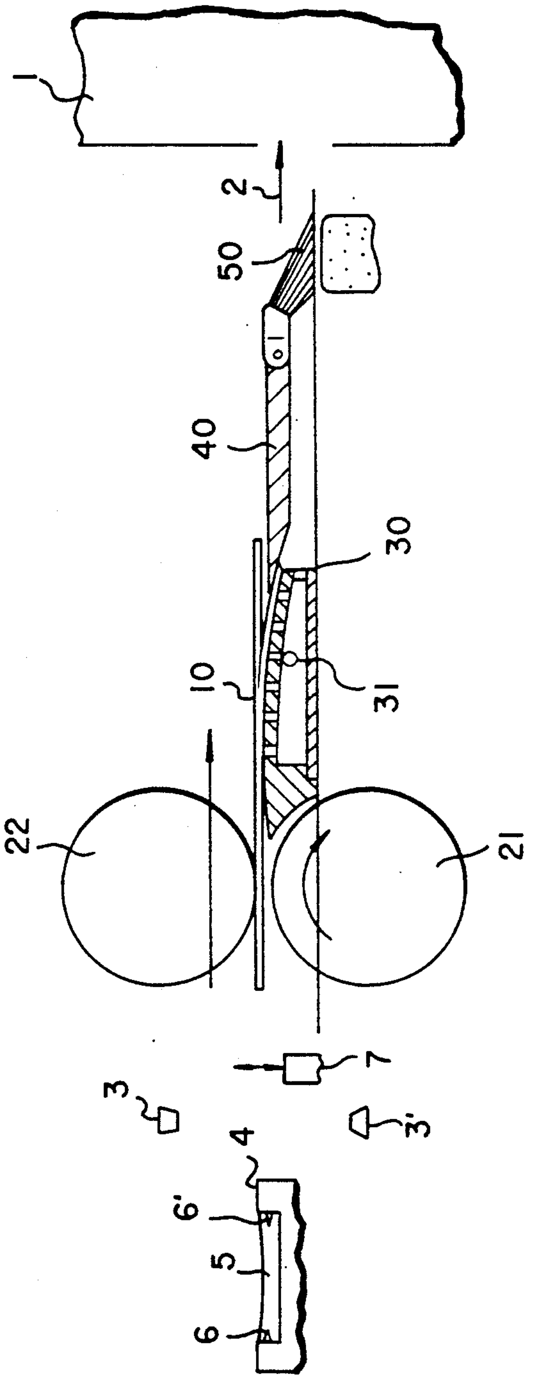

The invention relates to a device for lifting flaps of envelopes at feed inlets of machines for sealing envelopes.

Devices for lifting flaps of envelopes, which cause the spreading of the flap away from the envelope by mechanical deformation, are part of the prior art and are described, for instance, in German Published, Non-Prosecuted Applications DE-26 32 913 and DE-29 48 929. Mechanical deformation may fail in the case of stiff or fully stuffed envelopes, so that the subsequent sealing process cannot be performed. Relief is provided by a device which lifts an envelope flap sufficiently by directing pulsed blows of air against an envelope, so that the seal can be subsequently moistened by a moistening device, as in German Published, Non-Prosecuted Application DE-33 37 488. That device requires a hold-down device having a pressing force which must be adapted, as necessary, to the thickness of the envelope or letter and the force of the air flow.

It is accordingly an object of the invention to provide a device for lifting flaps of envelopes, which overcomes the hereinafore-mentioned disadvantages of the heretofore-known devices of this general type and which permits processing of open as well as closed envelopes regardless of their thickness and without the use of a hold-down device.

With the foregoing and other objects in view there is provided, in accordance with the invention, a device for lifting flaps of envelopes at feed inlets of an envelope sealing machine, comprising a perforated suction plate having edges, and a separating plate having edges and being disposed downstream of the suction plate in an envelope feed direction, the suction plate and the separating plate being associated with a feed inlet of an envelope sealing machine, and one of the edges of the suction plate being underneath one of the edges of the separating plate.

In accordance with another feature of the invention, the suction plate has a convex surface.

In accordance with a further feature of the invention, there is provided a sensing device disposed upstream of the suction plate for controlling the suction plate.

In accordance with an added feature of the invention, there is provided a sensing device having position detectors for detecting a hanging envelope flap.

In accordance with an additional feature of the invention, there is provided a sensing device having means for guiding an air flow against an envelope.

In accordance with a concomitant feature of the invention, the sensing device is a simplified suction device.

Other features which are considered as characteristic for the invention are set forth in the appended claims.

Although the invention is illustrated and described herein as embodied in a device for lifting flaps of envelopes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
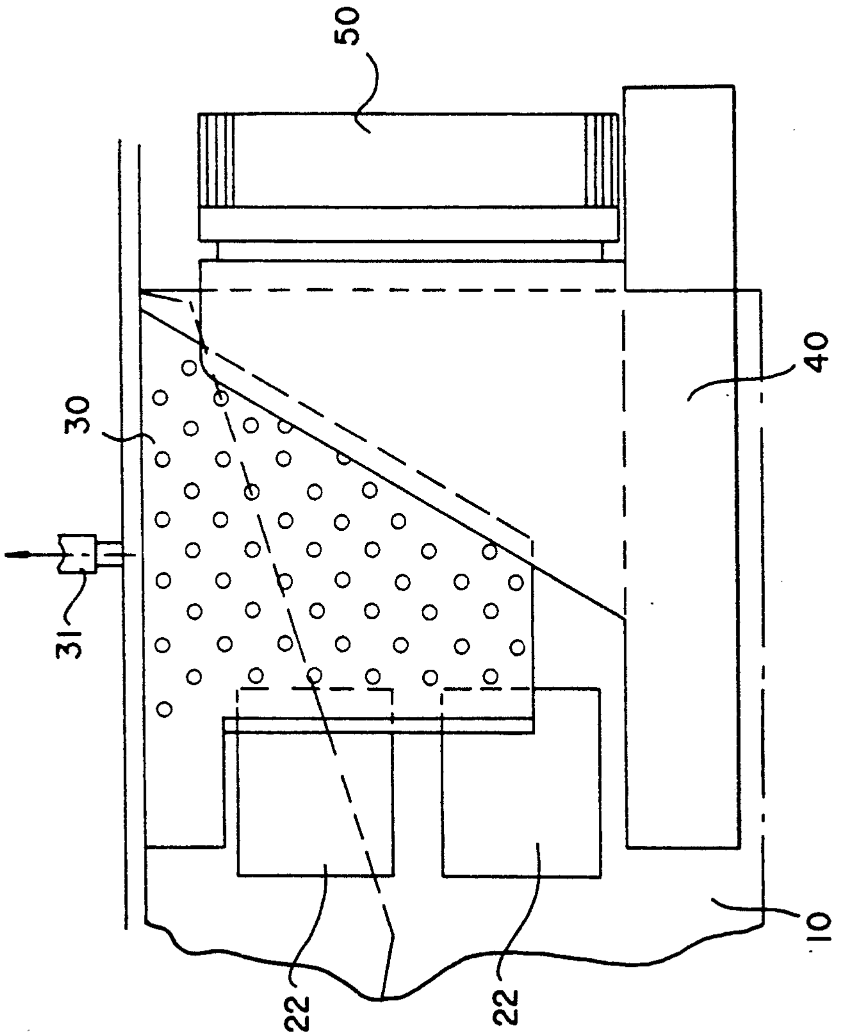

FIG. 1 is a fragmentary, diagrammatic, lateral-sectional view of a portion of the device for lifting flaps of envelopes; and FIG. 2 a plan view of the device shown in FIG. 1.

Referring now to FIGS. 1 and 2 of the drawing in detail, there is seen a device for lifting flaps of envelopes which is disposed at a feed inlet 2 of a machine 1 for sealing envelopes. It is seen that after separation, an envelope 10 moves through a feed roller 21 and a pressure roller 22 over a perforated suction plate 30. A separating plate 40 is placed downstream of the suction plate 30. In this case, the edge of the suction plate 30 facing the separating plate 40 is located underneath the front edge of the separating plate 40, as seen when looking in the feed direction of an envelope. The surface of the suction plate 30 is convexly arched. Air is aspirated through the perforations by using a suction connector 31, and it is controlled by sensing devices, for example photoelectric barriers 3, 3' which sense the arrival of an envelope 10. Therefore, the envelope flap of an unsealed envelope 10 conducted over the suction plate 30 is drawn down and slides under the separation plate 40. A moistening device 50 which is placed downstream moistens the seal and a non-illustrated pressure device seals the envelope.

If an already sealed envelope or letter reaches the suction plate 30, it is conducted over the top of the separating plate 40 because of the weakness of the suction power and because of its own stiffness.

According to a further embodiment of the invention, upstream of the feed roller 21, a guide surface 4 for the envelope 10 is provided with a recess 5 acting as a sensing device, which recess does not support the envelope flap with respect to the major part of the envelope 10. Thus, the envelope flap is subjected to gravity and hangs down in the recess 5 where, for example, it breaks a beam of light passing between photoelectric barriers 6, 6'. It is determined by means of the barriers or position detectors 6, 6' whether or not the envelope is sealed and the suction device is controlled accordingly.

In place of the sensing device for detecting the sealed state of an envelope because of the action of gravity, it is also possible to use the previously mentioned device 31 for ejecting an air flow, or a simplified suction device 7. The device 7 can also be a blower for guiding an air flow against an envelope 10.

I claim:

1. A device for lifting flaps of envelopes at feed inlets of an envelope sealing machine, comprising a perforated suction plate having edges, and a separating plate having edges and being disposed downstream of said suction plate in an envelope feed direction, said suction plate and said separating plate being associated with a feed inlet of an envelope sealing machine, and one of said edges of said suction plate being underneath one of said edges of said separating plate.

2. The device according to claim 1, wherein said suction plate has a convex surface.

3. The device according to claim 1, including a sensing device disposed upstream of said suction plate for controlling said suction plate.

4. The device according to claim 1, including a sensing device having position detectors for detecting a hanging envelope flap.

5. The device according to claim 1, including a sensing device having means for guiding an air flow against an envelope.

6. The device according to claim 3, wherein said sensing device is a simplified suction device.

7. The device according to claim 1, including a sensing device having a guide surface for envelopes, said guide surface having a recess formed therein for receiving envelope flaps, and means associated with said recess for detecting presence of an envelope flap in said recess and for controlling said suction plate.

* * * * *